United States Patent [19]

Molitorisz

[11] Patent Number: 5,242,327
[45] Date of Patent: Sep. 7, 1993

[54] FLEXIBLE COUPLING EMPLOYING ANGLED RODS

[76] Inventor: Joseph Molitorisz, 15326 SE. 43rd Pl., Bellevue, Wash. 98006

[21] Appl. No.: 763,566

[22] Filed: Sep. 23, 1991

Related U.S. Application Data

[63] Continuation-in-part of Ser. No. 716,283, Jun. 17, 1991, abandoned.

[51] Int. Cl.⁵ .......................... F16C 1/24; F16D 3/08
[52] U.S. Cl. .......................................... 464/7; 464/50; 464/904
[58] Field of Search .................. 464/50, 7, 137, 904

[56] References Cited

U.S. PATENT DOCUMENTS

| | | | |
|---|---|---|---|
| 431,039 | 7/1890 | Dobson | 464/50 |
| 1,315,680 | 9/1919 | Nordberg | 464/50 X |
| 3,782,135 | 1/1974 | Beden | 464/50 |
| 3,995,449 | 7/1976 | Doffe | 464/50 |
| 4,368,049 | 1/1983 | Klomp | 464/50 |

Primary Examiner—Daniel P. Stodola
Assistant Examiner—William G. Battista, Jr.

[57] ABSTRACT

A coupling mechanism employing connecting drive rods for the transmission of rotational drive between two shafts with intersecting axes of rotation. The mechanism provides; self-containment of the coupler, self-alignment and controlled axial displacement of the coupled shafts, pressure activated lubrication of the coupler mechanism, constant or variable angle of intersection of the coupled shafts, and constant angular velocity power transmission.

4 Claims, 1 Drawing Sheet

FLEXIBLE COUPLING EMPLOYING ANGLED RODS

This application is continuation-in-part of application Ser. No. 07/716,283, filed Jun. 17, 1991, now abandoned.

BACKGROUND OF THE INVENTION

The common mechanical angular rotational power transmissions are in two basic types; gear types, and universal joint types.

In gear type transmissions the rotational motion and torque are transmitted by mashing teeth of a pair of gears. The exact alignment of the gears is maintained by bearing supported shafts in a rigid housing. Any flexibility for axial displacement of the shafts is provided externally to the housing by telescoping, or splined shafts. The speed ratio of the input and output shafts is determined by the number of teeth of the gears. The rotational motion is transmitted at steady, constant angular velocity. The angle of intersection of the axes of rotation of the coupled shafts is constant.

Universal joint type couplers employ two forks attached to the coupled shafts, and a yoke which is journally attached to both forks. Universal joints require neither rigid housing nor bearing support for the shafts, as alignment of the coupled shafts is provided by the forks and the yoke. Flexibility for axial displacement of the coupled shafts is provided by telescoping, or splined shafts. The speed ratio of the transmitted rotational motion is one-to-one. The rotational motion is transmitted at a cyclic, varying rate during each revolution, which is directly proportional to the angle of intersection of the coupled shafts. The angle of intersection of the axes of rotation of the coupled shafts is variable between about 0 and 45 degrees.

SUMMARY OF THE INVENTION

This invention provides simple coupling mechanism for the transmission of torque and rotational motion between two shafts, at constant angular velocity, without gears, at fixed or variable angle of intersection of the rotational axes of the coupled shafts.

It employs a plurality, but at least three connecting drive rods which are slideably inserted into the receiving holes on the ends of both of the connected shafts, or rotary heads which are attached to the shafts. The receiving holes are drilled parallel to axis of rotation of the shafts, and are on identical angular and radial distribution. The holes are made deep enough for adequate bearing support for the connecting drive rods.

The connecting drive rods can be straight, or can be bent into identical angles ranging between 0 and 90 degrees. If straight, the axes of rotation of the coupled shafts are held co-linear by the connecting drive rods. If bent, the axes of rotation of the coupled shafts intersect at the same angle as that of the connecting drive rods.

If either of the coupled shafts receives rotational power drive, the connecting drive rods transmit the rotational motion to the other shaft. Since the angular and axial displacement of each of the connecting rods is simultaneous and identical in the receiving holes of both rotary heads, the angular velocity of the transmitted rotational motion remains unchanged.

This mode of power transmission is fundamentally different from gear type couplers, in which only one, or possible two teeth of each gear are engaged at any moment. In my invention torque is transmitted by each of the connecting rods.

This mode of power transmission is also fundamentally different from the conventional universal joint, which employs bearing mounted yoke as connecting element between two U shaped forks which are attached to the coupled shafts. The angularity of the connected shafts is compensated for by the angular movement of the yoke, causing uneven angular velocity transmission. The larger the angle between the shafts, the greater the fluctuation in the transmitted angular velocity becomes. In most application the angle is limited between 0 and 45 degrees.

In my device the connecting drive rods serve not only as power transmission elements, but also as supporting means for the coupled shafts. As illustration let us consider two shafts coupled by a plurality of connecting drive rods. One of the shafts is supported by bearings, while the other shaft can remain in a "floating" state, receiving its radial support from the connecting drive rods only. The connecting drive rods also maintain alignment of the coupled shafts. The limited axial displacement of the connecting drive rods in the receiving holes allows controlled axial flexibility for the shafts.

For proper frictional conditions between the connecting drive rods and the receiving holes of the rotary heads, frictional sleeve bearing are inserted. The sleeves are dimensioned for tight fit within the receiving holes, and for slideable insertion of the connecting drive rods. In length they are dimensioned to provide the desired bearing surface for the rods.

Interference between the retaining rings installed on the ends of the connecting drive rods and the bearing sleeves prevents the sliding-out of the rods from the receiving holes, thereby providing self-containment of the coupler. The retaining rings also limit the axial movement of the coupled shafts. The removable retaining rings allow easy assembly and disassembly of the coupler.

Self-alignment of the connected shafts is essential for proper operation of the coupler. In case of mis-alignment excessive wear of the connecting rods and of the receiving holes can occur. In my invention the receiving holes are made deep enough to provide optimum bearing surface for the connecting rods at any operating position for proper self-alignment.

The reciprocating motion of the connecting rods in the receiving holes develops cyclic compression and suction, which under tight tolerances between the connecting drive rods and the receiving holes can adversely effect the function of the coupler. To eliminate this adverse effect, internal passages are provided between the individual receiving holes for free exchange of air. Since the direction of the displacement of the rods in the receiving holes is opposite in the 180 degree phases of rotation of the rotary heads, the exchange of air through the internal passages between the receiving holes eliminates the build-up of pressure and suction.

In high speed, or high torque applications continuous lubrication of the receiving holes is necessary. The reciprocating motion of the connecting rods together with the connecting passages provides continuous forced distribution of liquid lubricants within and between the receiving holes. To prevent contamination of the lubricants the receiving holes are sealed from the external environment.

In summary; My invention serves as angular rotational power transmission between two shafts;
a), not requiring rigid housing,
b), providing constant angular velocity transmission.
c), providing fixed or variable angle of intersection of the axes of rotation of the coupled shafts in the range of 90 to 180 degrees,
d), providing self-containment of the mechanism,
e), providing limited axial displacement of the coupled shafts,
f), providing sealed internal confinement for corrosion protection,
g), providing internal, pressurized lubrication.

DESCRIPTION OF THE PREFERRED EMBODIMENT

Figure 1:
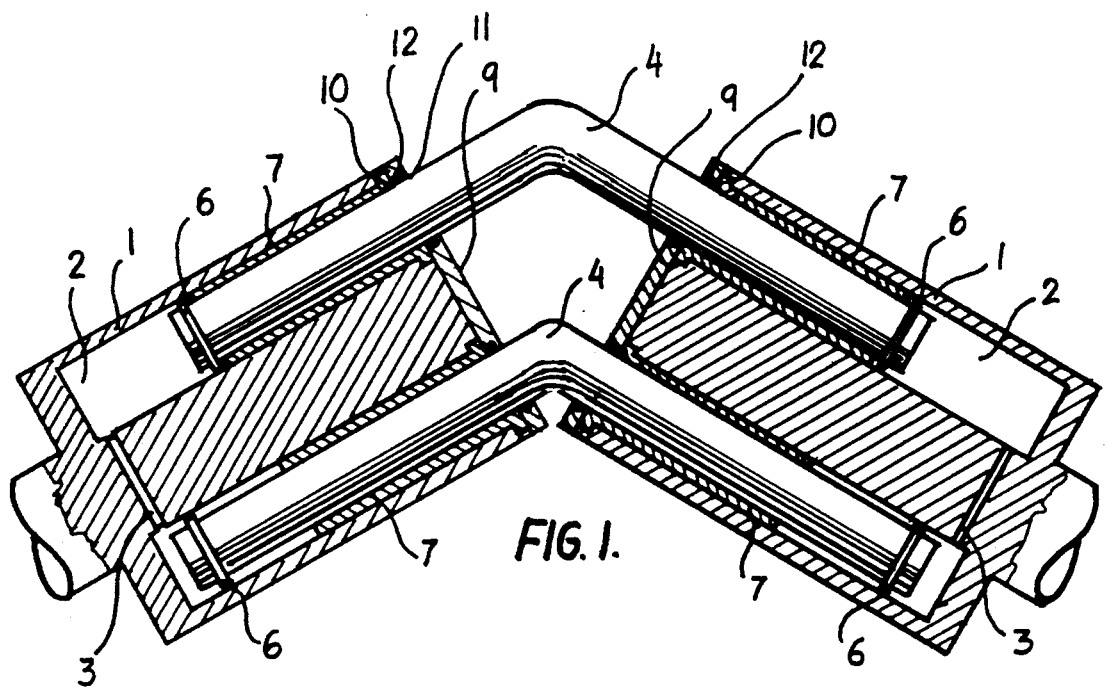
FIG. 1, is a cross-sectional elevation of the coupler along the broken line of FIG. 2.
Figure 2:
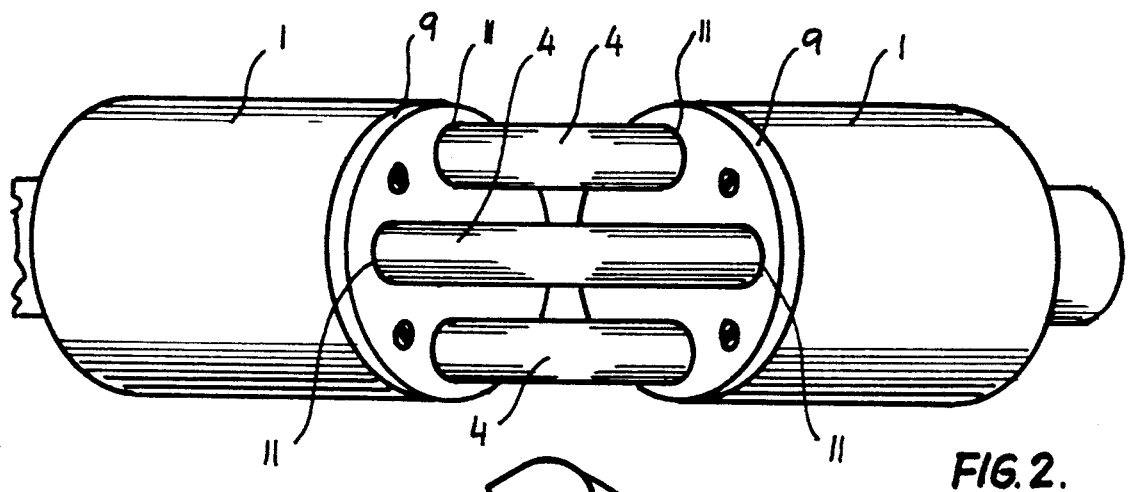
FIG. 2, is the top elevation of the coupler assembly.
Figure 3:
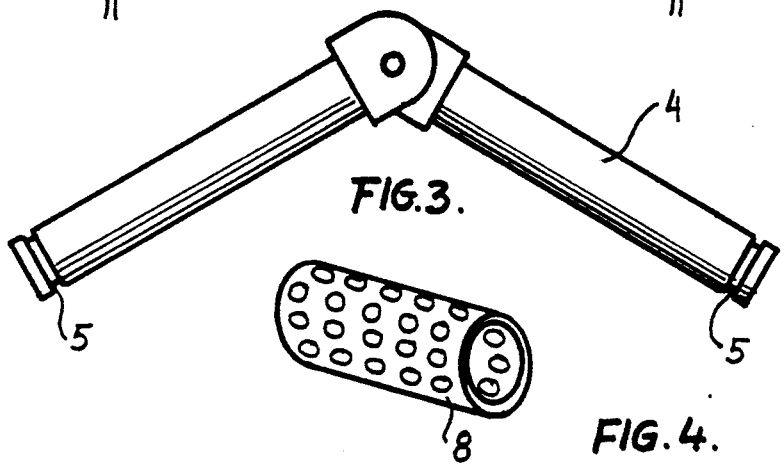
FIG. 3, is a side elevation of the pivotally jointed connecting drive rod.
Figure 4:
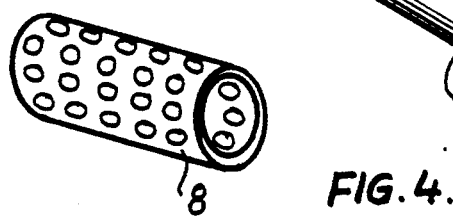
FIG. 4, is a schematic isometric elevation of the ball cage bearing assembly.

The assembly of the coupler shown on FIG. 1 and FIG. 2 consists of; two rotary heads (1), which can be part of the connected shafts, or can be attached to the shafts. Each head has a plurality, but at least three receiving holes (2) on identical radial and angular arrangements. The holes are parallel to the axis of rotation of the rotary head, and are open only on the end surface of the rotary head for the insertion of the connecting drive rods. The holes are made deep enough for adequate bearing support for the inserted connecting drive rods (4). The receiving holes (2) are interconnected individually to passages (3), which are drilled at the blind end of the receiving holes. The passages are sealed from the external environment. The diameter of the passages is sufficiently large to allow free exchange of air and lubricants between the receiving holes. The connecting drive rods (4) can be made of one piece bars bent into identical angles in the range of 0 to 90 degrees, for constant angle of intersection of the axes of rotation of the coupled shafts, or can be assembled from two pivotally jointed straight pieces of round bars, shown on FIG. 3, for variable angle of intersection of the axes of rotation of the connected shafts. Both the rigid and the jointed connecting drive rods (4) are made long enough to provide proper self-alignment of the shafts by penetrating the bearing (7), or (8) to a depth of not less than three times the diameter of the connecting drive rods at any operating condition of the coupler. Both the bent and the journally jointed connecting drive rods (4) have grooves (5) at their ends for the installation of removable retaining rings (6), providing self-containment of the coupler and for limiting the axial displacement of the connecting rods within the receiving holes. As bearing means for the slideable insertion of the connecting drive rods, frictional bearings (7), or non-frictional ball bearings (8) are inserted in each of the receiving holes. The frictional type bearings are retained in the receiving holes against axial and rotational motion by flanges, which are seated in recesses (10) of the receiving holes. The flanges are held in the recesses by cover plate (9). For the non-frictional bearings both axial and angular movements within the receiving holes are allowed between the cover plate (9) and the retaining rings (6). As external retaining means for either the frictional, or non-frictional bearings, the cover plates (9) are removably secured to the end surfaces of the rotary heads. The minimum penetration of the connecting drive rods (4) into the receiving holes (2) for proper self-alignment of the coupled shafts is determined by the length of the frictional, or non-frictional bearings. The cover plates (9) have holes for the connecting drive rods. The holes are in the same angular and radial distribution as that of the receiving holes of the heads. Each of the holes has circular grooves for the installation of sealing rings (12).

While the preferred form of the invention has been illustrated and described, it should be understood that changes may be made without departing from the principles thereof, accordingly, the invention is to be limited by the literal interpretation of the claims appended hereto.

I claim:

1. Coupling mechanism for the transmission of rotational power drive between two shafts with intersecting axes of rotation, said coupling mechanism comprising;

a), a pair of rotary heads, each of said rotary heads having a plurality of receiving holes for the insertion of connecting drive rods, said receiving holes being parallel to the axis of rotation of said rotary heads and being arranged in identical angular and radial distribution, said receiving holes being open only on one of the end surfaces of said rotary heads for the insertion of the connecting drive rods, said receiving holes being connected to each other individually by passages which are internal to said rotary heads, b), a plurality of connecting drive rods, said connecting drive rods being made of round bar and being bent into identical angles between 0 and 90 degrees, said connecting drive rods having grooves at both ends for removable retaining rings, c), frictional sleeve bearings being inserted into the said receiving holes of said rotary heads for slideable insertion of said connecting drive rods, d), removable retaining rings installed in said grooves of said connecting drive rods, said retaining rings interfering with said frictional sleeve bearings to retain the said connecting drive rods within said receiving holes of said rotary heads, e), cover plates removably secured to the end surfaces of said rotary heads, said cover plates retaining said frictional sleeve bearings within said receiving holes of said rotary heads against axial and rotational motion, said cover plates having properly dimensioned holes on angular and radial distribution identical to the distribution of said receiving holes on said rotary heads for the insertion of said connecting drive rods, said cover plates having grooves for sealing rings for each of said connecting drive rods, f), sealing rings for each of said connecting drive rods, said sealing rings being retained by said grooves of said cover plates.

g), whereby said passages are sealed from the external environment, and under the reciprocating action of the connecting drive rods free exchange of air, and forced distribution of lubricants between said receiving holes is allowed.

2. The coupling of claim 1, having connecting drive rods made of two straight sections pivotally connected to each other for variable angle of intersection of the coupled shafts.

3. Coupling mechanism for the transmission of rotational power drive between two shafts with intersecting axes of rotation, said coupling mechanism comprising;
   a), a pair of rotary heads, each of said rotary heads having a plurality of receiving holes for the insertion of connecting drive rods, said receiving holes being parallel to the axis of rotation of said rotary heads and being arranged in identical angular and radial distribution, said receiving holes being open only on one of the end surfaces of said rotary heads for the insertion of the connecting drive rods, said receiving holes being connected to each other individually by passages which are internal to said rotary heads,
   b), a plurality of connecting drive rods, said connecting drive rods being made of round bar and being bent into identical angles between 0 and 90 degrees, said connecting drive rods having grooves at both ends for removable retaining rings,
   c), non-frictional bearings being inserted into the said receiving holes of said rotary heads for axially and angularly movable insertion of said connecting drive rods,
   d), removable retaining rings installed in said grooves of said connecting drive rods, said retaining rings interfering with said non-frictional bearings to retain the said connecting drive rods within said receiving holes of said rotary heads,
   e), cover plates removably secured to the end surfaces of said rotary heads, said cover plates retaining said non-frictional bearings within said receiving holes of said rotary heads, said cover plates having properly dimensioned holes on angular and radial distribution identical to the distribution of said receiving holes on said rotary heads for the insertion of said connecting drive rods, said cover plates having grooves for sealing rings for each of said connecting drive rods,
   f), sealing rings for each of said connecting drive rods, said sealing rings being retained by said grooves of said cover plates.
   g), whereby said passages are sealed from the external environment, and under the reciprocating action of the connecting drive rods free exchange of air, and forced distribution of lubricants between said receiving holes is allowed.

4. The coupling mechanism of claim 3, having connecting drive rods made of two straight sections pivotally connected to each other for variable angle of intersection of the coupled shafts.

* * * * *